(12) United States Patent
Mueller-Marc et al.

(10) Patent No.: US 8,208,194 B2
(45) Date of Patent: Jun. 26, 2012

(54) DISPLAY DEVICE COMPRISING DISPLAY ELEMENTS WITHOUT BACKFLOW DUCTS

(75) Inventors: Oliver Mueller-Marc, Appenzell (CH); Dieter Jerosch, Bad Soden (DE); Andriy Bitman, Dortmund (DE); Frank Bartels, Hattingen (DE)

(73) Assignee: Advanced Display Technology AG, Appenzell (CH)

( * ) Notice: Subject to any disclaimer, the term of this patent is extended or adjusted under 35 U.S.C. 154(b) by 0 days.

(21) Appl. No.: 13/052,403

(22) Filed: Mar. 21, 2011

(65) Prior Publication Data

US 2011/0235157 A1 Sep. 29, 2011

(30) Foreign Application Priority Data

Mar. 27, 2010 (DE) .......................... 10 2010 013 151

(51) Int. Cl.
*G02B 26/00* (2006.01)
*G09G 3/34* (2006.01)

(52) U.S. Cl. ....................................... 359/296; 345/107

(58) Field of Classification Search ................. 359/290, 359/295, 296; 345/30, 48, 50, 60, 84, 107
See application file for complete search history.

(56) References Cited

U.S. PATENT DOCUMENTS

| 5,956,005 A | 9/1999 | Sheridan | |
|---|---|---|---|
| 6,741,385 B2 * | 5/2004 | Ikeda et al. | 359/296 |

FOREIGN PATENT DOCUMENTS

WO 2009036272 A1 3/2009

* cited by examiner

*Primary Examiner* — Jack Dinh
(74) *Attorney, Agent, or Firm* — Marshall & Melhorn, LLC

(57) ABSTRACT

The invention relates to a display device having at least one electronically controllable display element comprising at least one non-polar and at least two electrically conducting or polar liquids, a fluidically closed volume having a visible subvolume, a further subvolume and at least two storage volumes connected to said subvolumes, as well as a voltage source connected to a first electrode array. It is provided thereby that each of said electrically conducting or polar liquids assumes a volume which is dimensioned such that, independent of application of voltage to the electrode array, always a fluidically tight closure for non-polar liquid between the respective storage volume and either the visible or the further subvolume is formed.

10 Claims, 2 Drawing Sheets

DISPLAY DEVICE COMPRISING DISPLAY ELEMENTS WITHOUT BACKFLOW DUCTS

BACKGROUND OF THE INVENTION

The invention relates to a display device having at least one electronically controllable display element. More specifically, the invention relates to a display device which makes use of the effect of electrowetting.

It is well known to realize display devices with the aid of colored liquids wherein the liquids can be displaced between positions which are not visible and those which are visible for a viewer. An efficient means for displacing liquids is the so-called electrowetting wherein a voltage is supplied to an electron array which is immediately adjacent to a liquid droplet, so that an electric field acts upon the liquid droplet, consequently increasing surface energy and therefore surface tension of the liquid. Depending on the configuration, this can lead to spreading of the liquid on the electrode or covering the same completely, depending on the geometry and/or surface nature of the electrode and on the relative position of liquid and electrode also with regard to the earth gravity field. It is known to provide a hydrophobic coating to the electrodes, in order to achieve a maximum effect between the state of the liquid when the electrode is not driven and when the electrode is driven. Using only the aforementioned means, it is already possible to realize a droplet movement without reverting to further functional elements.

By a local variation of the electric field strength, therefore the local surface energy of the liquid may be modified and thus, the geometry of a droplet can be changed locally. In particular, a movement of the droplet may occur caused by generation of a locally increased surface energy, wherein said droplet extends preferably into the corresponding region characterized by the presence of an electric field. Inversely, liquid is dragged from the influenced part of the droplet due to the surface tension, out of a region in which it is not influenced and therefore comprises a lower surface energy, since it tends in this region towards a geometry which is lowest in energy, namely that of a sphere. A net transport of liquid from the region of lower field strength to the region of higher field strength results thereby.

Various display devices have already been realized on this basis. Usually, it was always the objective to create an electronically controllable bistable display element which selectively assumes one or the other state. It is for example known to reciprocate a liquid between a first and a second volume which are in communication via a duct with the aid of the effect of electrowetting, wherein each volume comprises an associated electrode, so that the conveying direction respectively results from the ratio of field strength between both electrodes. Preferably, a potential is respectively supplied only to that electrode in which direction the liquid is to be conveyed.

A display device comprising an electronically controllable display element is known from U.S. Pat. No. 5,956,005 A, wherein an electrode array is configured to move a polar liquid from a reservoir volume into a flat subvolume, wherein said polar liquid assumes a volume which is dimensioned such that independently of a supply of voltage to the electrode array a fluidically tight closure between the reservoir volume and the flat subvolume will always form.

An electrowetting based display device is known from WO 2009/036272 A1, wherein a pair of electrodes forming a capacitor is associated with each display pixel, whereby a liquid located in the visible volume of the pixel can be charged with an electric field. A return transport of the polar or electrically conducting liquid into a reservoir which is below a visible display area in viewing direction to the display element is achieved in that the geometries of the visible display volume and of the reservoir are adjusted, so that the polar or electrically conducting liquid, if not charged with an electric field, is drawn into the reservoir due to the Young-Laplace pressure.

If a multi-colored display is to be realized with the aid of the aforementioned technology, this would be possible only by means of a plurality of pixels which are arranged side by side on said display area and which comprise differently colored liquids. However, it is not possible to operate the device according to WO 2009/036272 A1 in such a way that an individual pixel may assume more than two color states.

Moreover, the technologies known from the prior art are based on the principle that a liquid exchange between two corresponding subvolumes always takes place for a change of state of a display element, wherein the one liquid is an electrically conducting or polar liquid which, when energized by an electric field, can be conveyed, and the other liquid is a non-polar liquid which evades the electrically conducting or polar liquid precisely into that subvolume from which the electrically conducting or polar liquid is removed. In order to avoid a hydraulic bottleneck, backflow ducts are always provided, so that depending on the movement of the electrically conducting or polar liquid, the non-polar liquid can flow off for pressure equalization.

Use of backflow ducts has not only aesthetic disadvantages since they must at least partly be arranged in the visible subvolume of the display element, but furthermore also the disadvantage that they need a certain space which counter acts to the basic aim of constantly increasing pixel densities.

SUMMARY OF THE INVENTION

Therefore, it is the object of the invention to further develop the technology known from WO 2009/036272 A1, so that an individual display element can assume more than two color states. Moreover, the display element to be proposed should be as flat as possible in a direction perpendicular to the display plane, simultaneously, however, offer an aperture which is as high as possible. Finally, it is desirable that the proposed display element abandons the use of backflow ducts.

This object is solved by a display device according to the invention which includes at least one electronically controllable display element, comprising:

at least one non-polar and at least two electrically conducting or polar liquids, wherein at least said electrically conducting or polar liquids are immiscible with the non-polar liquid and wherein said electrically conducting or polar liquids are always spatially separated from another;

a fluidically closed volume comprising a visible subvolume, a further subvolume and at least two storage volumes in fluidic communication with said visible subvolume and said further subvolume for providing respectively only one of said electrically conducting or polar liquids in which respectively at least a portion of said non-polar liquid is located when said electrically conducting or polar liquid provided in the respective storage volume is located in said visible subvolume or in said further subvolume at least for its most part;

at least one voltage supply source connected to a first electrode array which is adapted to selectively intersperse said further subvolume at least in sections with an electrical field, such that at least one of said electrically conducting or polar liquids is at least partly movable from its storage volume into said further subvolume; wherein in said further subvolume an overpressure or in said visible subvolume an underpressure is respectively created causing that said electrically conducting or polar liquid which is not subjected to an electric field of said first electrode array is drawn into said visible subvolume, wherein said visible and said further subvolumes are flat, with dimensions which are selected such that said electrically conducting or polar liquids in a de-energized state of said first electrode array are drawn into the respective storage volume due to the Young-Laplace pressure, and wherein said first electrode array and/or said further subvolume comprise a geometric structure preventing mixing of said electrically conducting or polar liquids, if plural thereof are present in subvolume; and wherein each of said electrically conducting or polar liquids assumes a volume dimensioned such that they independently of being charged with voltage by said electrode array always form a fluidically tight closure for said non-polar liquid between the respective storage volume and either the visible or the further subvolume.

The present invention thus develops a completely new approach for using the effect of electrowetting. It is provided that at least two storage volumes are fluidically connected with a common visible subvolume and a common further subvolume, wherein said electrically conducting or polar liquids in a de-energized state of a first electrode array which is associated to the further subvolume, are provided by said storage volumes. This can be achieved by said visible and said further subvolumes respectively comprising a geometry forcing an electrically conducting or polar liquid droplet to be provided in one of said subvolume to assume a surface therein which is according to amount larger than the surface to be assumed by said droplet in the associated storage volume. A Young-Laplace pressure drop between said subvolume and said storage volume is the immediate consequence, so that a droplet in the de-energized state of said electrode array will tend to move in direction of the storage volume.

It is furthermore provided that the volume of each of said electrically conducting or polar liquids is dimensioned such that it is at least somewhat larger than the volume which can be assumed by the liquid both in the storage volume and in each of said subvolumes. It is an immediate consequence that said electrically conducting or polar liquid can never completely exit from its associated closure volume and can never be completely contained therein and thus always forms a closure of the respective storage volume preventing entering of non-polar liquid into the respective storage volume.

Further, since the invention in particular does not provide the use of backflow ducts, it is also not possible in corresponding display devices that pressure equalization in consequence of a transport of electrically conducting or polar liquid may only be achieved in that a respective volume of non-polar liquid assumes the volume becoming available within the storage volume. Since all storage volumes are fluidically connected both via the visible subvolume and via the further subvolume, it always follows from transport of a specific electrically conducting or polar liquid always that also the other electrically conducting or polar liquids are subjected to a pressure drop.

Therefore, if it is desired to convey a specific colored electrically conducting or polar liquid from its associated storage volume into the visible subvolume, this is achieved by conveying the remaining electrically conducting or polar liquids at least partly from their storage volumes into said further subvolume by operating the electrode array such that those electrically conducting or polar liquids which are not to be represented in said visible subvolume are drawn into the further subvolume. Since no backflow ducts are provided according to the invention, an overpressure develops in said further subvolume and an underpressure in the visible subvolume, respectively, during transport of the nonselected electrically conducting or polar liquid into said further subvolume, with the consequence that the selected electrically conducting or polar liquid which is not subjected to an electric field of said first electrode array is drawn into the visible subvolume.

It is apparent that the display device according to the invention moreover comprises the advantage that no electrodes need to be provided for transporting those electrically conducting or polar liquids which are to be displayed into said visible subvolume. This further essential difference versus prior art offers additional freedom in designing the visible subvolume.

Starting from the prior art, the skilled person will further recognize that the flat design of the visible and the further subvolume provided according to the invention must in particular be understood with respect to ensuring the application of Young-Laplace pressure to the electrically conducting or polar liquid necessary for operability of the proposed display device, if it is present within the visible or the further subvolume. Moreover, the skilled person will know that when designing the flat subvolumes and in particular its shortest dimensions in view of utilizing the Young-Laplace pressure also dimensioning of the storage volumes must be considered and the flat subvolumes and the storage volumes must be harmonized.

A further advantage of the proposed display device with respect to those known from the prior art consists in that it is now possible to represent more than two color states, in particular more than a colored and a colorless state, by means of one individual display element.

In a preferred embodiment of the invention, the geometries of said visible and said further subvolumes are adjusted such that the electrically conducting or polar liquids in a de-energized state of said electronic array form a fluidically tight closure between the respective storage volume and the further subvolume.

This can be done by adjusting the geometries of the visible subvolume and the further subvolume such that a smaller Young-Laplace pressure is applied to an electrically conducting or polar liquid which is located within said further subvolume, than on the same liquid, if it is located within the visible subvolume.

Since the electrically conducting or polar liquids as they are used in the prior art for traditional electrowetting display elements are principally miscible with another, the present invention provides that first electrode array and/or said further subvolume comprise a geometric structure preventing mixing of the electrically conducting or polar liquids, if plural thereof are at least partly present within said further subvolume. According to an embodiment it is provided that the structure of said electrode array consist in that it comprises a number of electrodes corresponding to the number of storage volumes, to which an electric voltage can be supplied independently and which are spatially separated from another, wherein each electrode is associated to only one storage volume and encloses the transition region between this storage volume and said further subvolume.

According to a further embodiment of the invention, the geometric structure of the further subvolume consist in that said further subvolume comprises at least one local necking.

It is suitable to form said visible subvolume in a first plane facing to a viewer, said storage volumes in a second plane underlying said first plane and said further subvolume in a third plane underlying said second plane. Fluidical connection of the storage volumes to said visible subvolume thereby occurs preferably at a bottom side of said visible subvolume facing away from a viewer. Fluidic connection of the storage volumes to said further subvolume occurs preferably at a front side of the further subvolume facing to a viewer.

Principally, it is possible to design the display device according to the invention in a reflective manner or, alternatively, also in a transflective manner, i.e. either by exclusively using ambient light or by using an additional light source. An embodiment of the display device according to the invention which is of reflective type is characterized in that said non-polar liquid is substantially transparent and therefore assumes the light of a reflector reflected at a bottom side of the visible subvolume when said non-polar liquid is present in said visible subvolume. Principally, the bottom side should represent that side of the flat visible subvolume at which the storage volumes are fluidically connected to the visible subvolume. It may be appropriate to dispose said reflector behind said visible subvolume when seen in direction of the incident light.

Alternatively, the display device may also be embodied transflective, by i.e. with aid of self-luminance display elements, comprising a light source having a specific color spectrum which is arranged below the visible subvolume in viewing direction to the display device and emits optical light which propagates at least partly through the visible subvolume antiparallel to the viewing direction of a viewer. It is therefore provided that said electrically conducting or polar liquids act as a color filter for the light of the light source. For realizing a transflective display device it must be taken into account that if an electrically conducting or polar liquid is present in the visible subvolume, the other electrically conducting or polar liquids are provided in said further subvolume and thereby present an obstacle for light emitted from a light source arranged at a rear side of said display element which influences the light spectrum emitted from said light source or decreases the emitted light intensity. For a transflective display device therefore optical structures must be provided which take care that light emitted at a rear side of the display element are guided around those regions of the further subvolume which are occupied by electrically conducting or polar liquids provided in said further subvolume. Alternatively, it would also be conceivable to introduce light laterally into the display elements, preferably in the region of the storage volumes whereby construction sufficient space for unhampered light propagation is present. Light distributing plates known from the prior art could be used wherein, depending on the embodiment, also a lateral light input is provided.

In a further embodiment of the invention it may be provided that said display element comprises a second electrode array to which an electrical voltage can be supplied which is adapted to selectively intersperse the visible subvolume with an electrical field at least in sections. This additional electrode array can in particular be used to improve propagation of the electrically conducting or polar liquid which is hydraulically conveyed into said visible subvolume.

In a preferred embodiment of the invention it is provided that said display element comprises at least one selection electrode having a hydrophobic surface which is wetted by a conducting or polar liquid which is located within the visible subvolume or within a storage volume, only if an electrical voltage is applied thereto, wherein said selection electrode is arranged in the transition region between said storage volume and said visible subvolume. This embodiment can be advantageous independently of whether said display device comprises a second electrode array to which an electric voltage can be supplied for interspersing the visible subvolume with an electric field or not.

If the display device, however, comprises said second electrode array and if it is embodied uniformly, so that as a consequence of its activation substantially the entire visible subvolume is interspersed with an electric field, it is necessary to keep the other electrically conducting or polar liquids which are not to be moved into said visible subvolume, in a certain distance to said second electrode array and in particular within said storage volumes. To achieve this, it can be provided that between each storage volume and said visible subvolume a hydrophobically coated selection electrode is brought into a transition region which is wetted by the electrically conducting or polar liquid only if a voltage is supplied thereto. Thereby it is appropriate that said hydrophobic selection electrode protrudes at least a little bit into the respective storage volume to thereby deprive electrically conducting or polar liquids provided therein of the influence of said second electrode array as long as the respective selection electrode is not supplied with an electric voltage. It is equally appropriate that said selection electrode protrudes a little bit into said visible subvolume in order to prevent that an electrically conducting or polar liquid which is located in said visible subvolume reaches the transition region to those storage volumes not associated therewith.

When using selection electrodes, it is appropriate to activate that selection electrode for conveying the selected electrically conducting or polar liquid into said visible subvolume, i.e. supply an electric voltage thereto, which is located in the transition region between its associated storage volume and the visible subvolume.

For backflow of an electrically conducting or polar liquid located in said visible subvolume into its associated storage volume it is appropriate to interrupt firstly supply of voltage to said second electrode array and thereafter supply of voltage to the associated selection electrode.

Additionally to the last-mentioned measure, elevations may be provided within said visible subvolume and around the transition region which form a barrier both for the electrically conducting or polar liquid which is inside the visible subvolume, and for those liquids which are present in the storage volumes.

According to an embodiment of the display device of the invention with use of selection electrodes it is provided that the selection electrodes are plated through the respective storage volume to the rear side of the display element, so that the display elements of the display device can be plated completely on their rear surfaces by means of standardized printed boards. Such through-plating of electrodes is known to the skilled person as micro vias and is mastered very well. By means of this embodiment, known TFT plates can be used as access elements. If it is not required that the produced total structure is transparent, as it is the case for example in systems which are operated completely reflective, even standardized FR4 boards or the like can be used as access elements. Since for these multi layered connection techniques the necessary driving elements of the display device, such as driving chips, can be mounted on the rear side of the construction, a practically seamless joining of individual submodules to form larger areas is possible.

In an embodiment of the invention it is provided that it contains precisely eight storage volumes which are fluidically connected to a common visible subvolume and wherein each storage volume accommodates one of the colors cyan, magenta, yellow, black, red, green, blue or white.

BRIEF DESCRIPTION OF THE DRAWINGS

Further details of the invention can be found in the description of the drawing which follows. It is shown in.

DETAILED DESCRIPTION OF THE INVENTION

Figure 1:
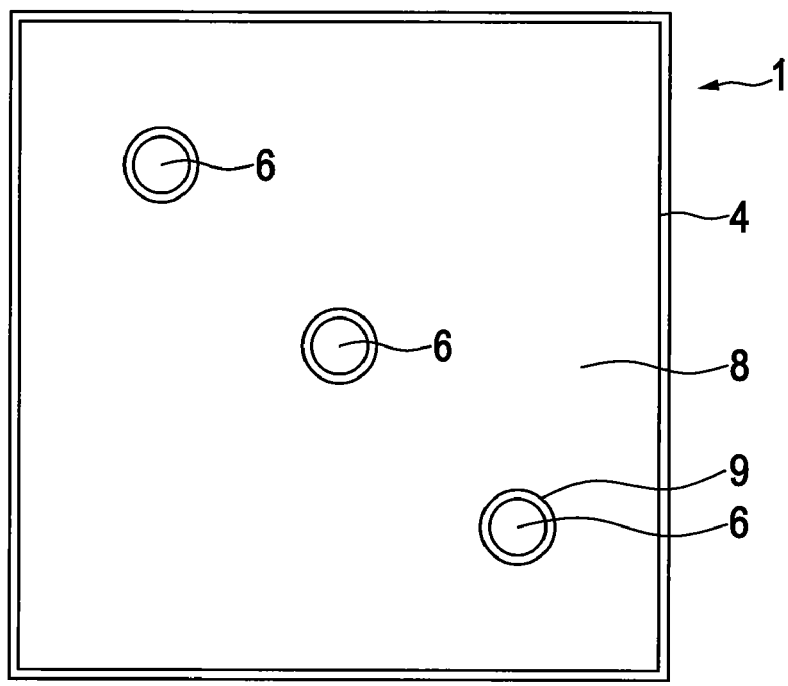
FIG. 1 a top view of an embodiment of the display element according to the invention.

The reference numerals utilized in the drawing figures are:
1 display element
2 electrically conducting or polar liquid
3 non-polar liquid
4 visible subvolume
5 further subvolume
6 storage subvolume
7 first electrode array
8 second electrode array
9 selection electrode
10 bottom side In FIG. 1, a top view of a first embodiment of a display element 1 according to the invention is represented. Further to a visible subvolume 4, which in this top view appears in particular by the presence of a second electrode array 8 provided in this embodiment, three storage volumes 6 are provided which in a transition region to said visible subvolume 4 or to said second electrode array 8 limiting said visible subvolume on one side, respectively, comprise a selection electrode 9 electrically isolated from said second electrode array 8. Selection electrode 9 is hydrophobically coated. In this way it is possible to embody second electrode array 8 uniformly, i.e. such that when voltage is supplied thereto, the total visible subvolume 4 is interspersed with an electric field which would basically lead to the consequence that each of said electrically conducting or polar liquids which are located in their associate storage volume 6 would be within the sphere of influence of the electric field. However, this can be suppressed with the aid of selection electrodes 9, namely by allowing only that electrically conducting or polar liquid to wet the associated hydrophobically coated selection electrode 9 when an electric voltage is supplied to its associated selection electrode 9 and to the second electrode array 8 simultaneously. The hydrophobic coatings of the other selection electrodes 9 where voltage is not applied prevent wetting of the corresponding electrically conducting or polar liquids and therefore entering into the transition region to the visible subvolume 4 where they would be in the sphere of influence of the electric field of second electrode array 8.

Figure 2:
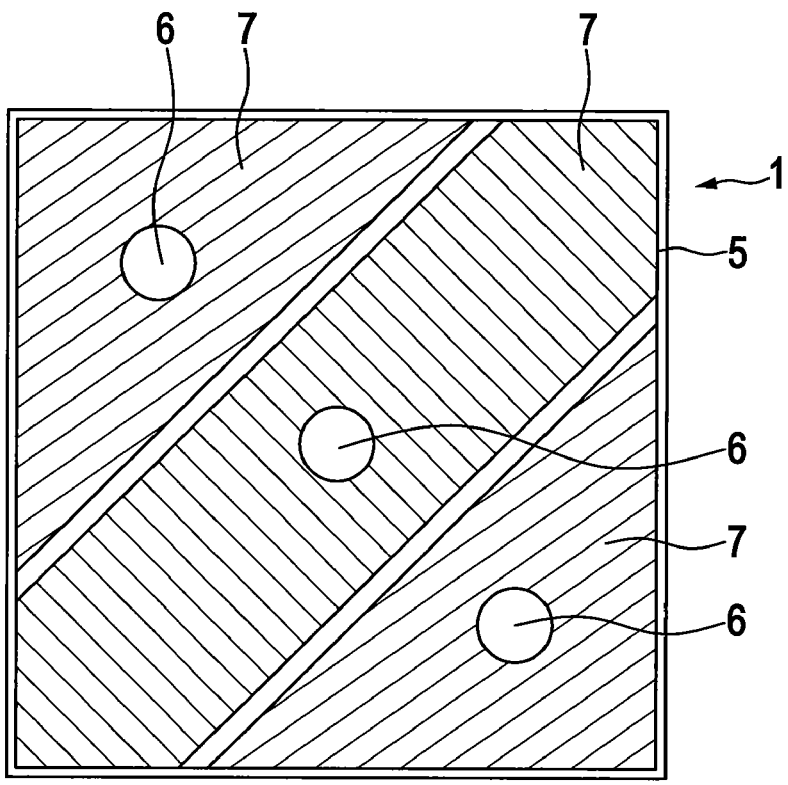
FIG. 2 a rear view of the embodiment of FIG. 1.

FIG. 2 shows a rear view of the display element 1 represented in FIG. 1. It may be recognized that a first electrode array 7 comprises a structure by which it is divided in particular into three electrodes which are electrically decoupled and can therefore be independently driven. It may be further recognized that each of said electrodes is associated to exactly one storage volume 6 and surrounds the transition region between one storage volume 6 and further subvolume 5. In this way, all electrically conducting or polar liquids within storage volumes 6 in a de-energized state of all electrodes of display element 1 can be driven independently, i.e. can be moved into further subvolume 5 where they cannot mix due to the structuring of electrode array 7 as long as plural thereof are present within further subvolume 5.

Figure 3:
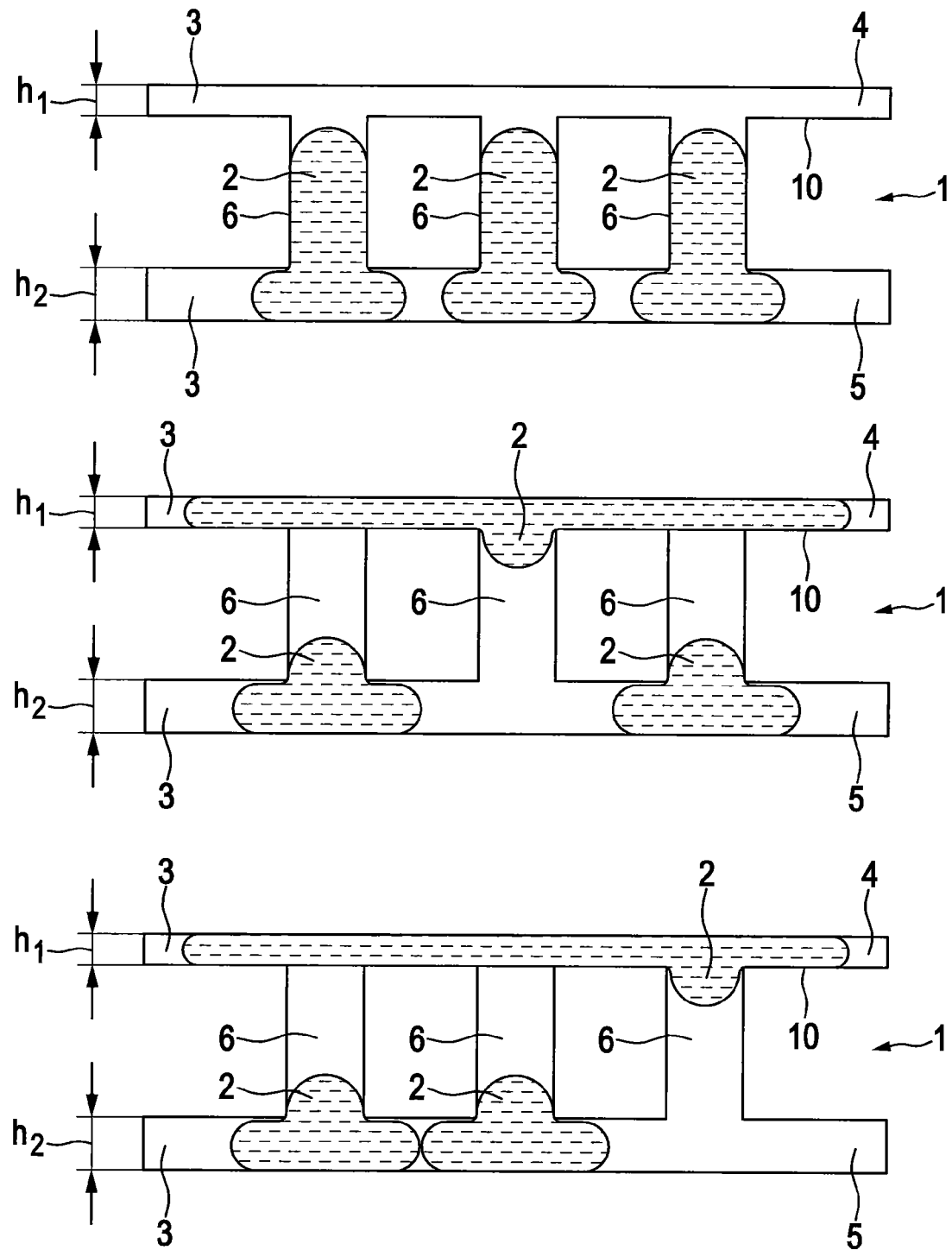
FIG. 3 three sectional views of a further display element according to the invention.

FIG. 3 shows three sectional views of an embodiment of a display element 1 according to the invention. Even though only three storage volumes 6 are represented in the sectional view, it is conceivable that further storage volumes 6 are provided in a direction perpendicular to the drawing plane which are equally fluidically connected to a visible subvolume 4 and to said further subvolume 5.

In the upper representation, the initial state of a display element 1 according to the invention is represented, when the first electrode array 7 and, if present, a second electrode array 8 is not supplied with voltage. In this case, the represented electrically conducting or polar liquids 2 are located within their associate storage volumes 6. It may also be recognized that the volume of each electrically conducting or polar liquid 2 is larger than its associated storage volume 6, so that even in a de-energized state of electrode arrays 7, 8, a part of each electrically conducting or polar liquid 2 protrudes into further subvolume 5. Since further subvolume 5 due to its larger height $h_2$ compared to visible subvolume 5, namely $h_2 > h_1$ allows electrically conducting or polar liquid 2 to assume a geometry of smaller surface compared to visible subvolume 5, the liquid fraction of the electrically conducting or polar liquid 2 which cannot be received in its associated storage volume 6 in a de-energized state of the electrode arrays 7, 8, prefers to enter into further subvolume 5 and not into visible subvolume 4. This partly entering of excessive liquid fraction affects the closure function essential for the invention, in the represented situation between the respective storage volume 6 and further subvolume 5.

Middle and lower representation in FIG. 3, respectively, show a state of the display element 1 according to the invention wherein an electrically conducting or polar liquid 2 is activated, i.e. is moved into visible subvolume 4. In the middle representation, this has been achieved by moving electrically conducting or polar liquid 2 on the left and right hand side of the representation into further subvolume 5 through supplying electric voltage to corresponding electrodes of said first electrode array which are not visible in the representation. In the lower representation, correspondingly, the left and middle electrode of the first electrode array were supplied with an electric voltage move electrically conducting liquid which is received in the left hand and the middle storage volume 6 in a de-energized state, into further subvolume 5. In both cases, movement of the electrically conducting or polar liquids into further subvolume 5 has led to a pressure drop between visible subvolume 4 and further subvolume 5, consequently, electrically conducting or polar liquid 2 which has not been drawn into further subvolume 5, has been hydraulically conveyed into visible subvolume 4. Middle and lower representation which show the display element 1 according to the invention in an activated state, also show that both subvolumes 4, 5 as well as storage volume 6 and volumes of electrically conducting or polar liquids are harmonized such that each electrically conducting or polar liquid 2, independent of its state, i.e. its location within display element 1, always forms a fluidically tight closure between the respective storage volume 6 and either visible or further subvolume 4, 5.

In case the display element represented in FIG. 3 provides use of selection electrodes, it is also appropriate for forming the aforementioned closure function that, in the middle representation, the selection electrode associated with middle storage volume 6 and, in the lower representation, the selection electrode associated with the right hand storage volume 6 is active, as long as the corresponding electrically conducting or polar liquid is displayed at least for its most part in visible subvolume 4.

The features disclosed in the foregoing description, in the claims and/or in the accompanying drawings may, both separately and in any combination thereof, be material for realising the invention in diverse forms thereof.

What is claimed is:

1. A display device including at least one electronically controllable display element, comprising:
    at least one non-polar and at least two electrically conducting or polar liquids, wherein at least said electrically conducting or polar liquids are immiscible with the non-polar liquid and wherein said electrically conducting or polar liquids are always spatially separated from another;
    a fluidically closed volume comprising a visible subvolume, a further subvolume and at least two storage volumes in fluidic communication with said visible subvolume and said further subvolume for providing respectively only one of said electrically conducting or polar liquids in which respectively at least a portion of said non-polar liquid is located when said electrically conducting or polar liquid provided in the respective storage volume is located in said visible subvolume or in said further subvolume at least for its most part; and
    at least one voltage supply source connected to a first electrode array which is adapted to selectively intersperse said further subvolume at least partly with an electrical field, such that at least one of said electrically conducting or polar liquids is at least partly movable from its storage volume into said further subvolume, wherein in said further subvolume an overpressure or in said visible subvolume an underpressure, respectively, is created causing that said electrically conducting or polar liquid which is not subjected to an electric field of said first electrode array is drawn into said visible subvolume,
wherein said visible and said further subvolumes are flat, with dimensions which are selected such that said electrically conducting or polar liquids in a de-energized state of said first electrode array are drawn into the respective storage volume due to the Young-Laplace pressure, and
wherein said first electrode array and/or said further subvolume comprise a geometric structure preventing mixing of said electrically conducting or polar liquids, if plural thereof are present in subvolume; and
wherein each of said electrically conducting or polar liquids assumes a volume dimensioned such that they independently of being charged with voltage by said electrode array always form a fluidically tight closure for said non-polar liquid between the respective storage volume and either the visible or the further subvolume.

2. The display device of claim 1, wherein geometries of said visible and said further subvolume are adjusted such that said electrically conducting or polar liquids in a de-energized state of said electrode array form said fluidically tight closure between the respective storage volume and said further subvolume.

3. The display device of claim 2, wherein geometries of said visible subvolume and said further subvolume are adjusted such that a lower Young-Laplace pressure is applied to an electrically conducting or polar liquid within said further subvolume than on the same liquid when in said visible subvolume.

4. The display device of claim 1, wherein the electrode comprises a number of storage volumes corresponding to the number of electrodes which can be supplied to electric voltage independently and are arranged spatially separated, wherein each electrode is associated with exactly one storage volume and surrounds the transition region between this storage volume and said further subvolume.

5. The display device of claim 1, wherein the display element comprises a second electrode array which can be supplied to an electric voltage and which is adapted to selectively intersperse said visible subvolume with an electric field at least in sections.

6. The display device of claim 1, wherein the display element comprises at least one selection electrode having a hydrophobic surface which is wetted by a conducting or polar liquid which is located within said visible subvolume or within one of said storage volumes only upon application of an electric voltage, wherein said selection electrode is arranged in the transition region between one of said storage volumes and said visible subvolume or within one of said storage volumes only if supplied to an electric voltage, wherein said selection electrode is arranged in the transition region between one of said storage volumes and said visible subvolume.

7. The display device of claim 5, wherein the display element comprises at least one selection electrode having a hydrophobic surface which is wetted by a conducting or polar liquid which is located within said visible subvolume or within one of said storage volumes only upon application of an electric voltage, wherein said selection electrode is arranged in the transition region between one of said storage volumes and said visible subvolume or within one of said storage volumes only if supplied to an electric voltage, wherein said selection electrode is arranged in the transition region between one of said storage volumes and said visible subvolume.

8. The display device of claim 1, wherein the geometric structure of said further subvolume is such that said further subvolume comprises at least one local necking.

9. The display device of claim 1, wherein the non-polar liquid is substantially transparent and thus the light reflected at a bottom side of said visible subvolume assumes the color of a reflector when said non-polar liquid is located within said visible subvolume and wherein said bottom side is that side of the flat visible subvolume at which said storage volumes are fluidically connected with said visible subvolume.

10. The display device of claim 1, wherein the selection electrodes are plated through the respective storage volume to the rear side of said display element, so that said display elements of said display device can be contacted in their entirety on their rear sides by means of standardized printed boards.

* * * * *